A. O. HARRIS.
VULCANIZER.
APPLICATION FILED DEC. 9, 1919.

1,370,438. Patented Mar. 1, 1921.
2 SHEETS—SHEET 1.

Inventor
A. O. Harris,
By
Attorney

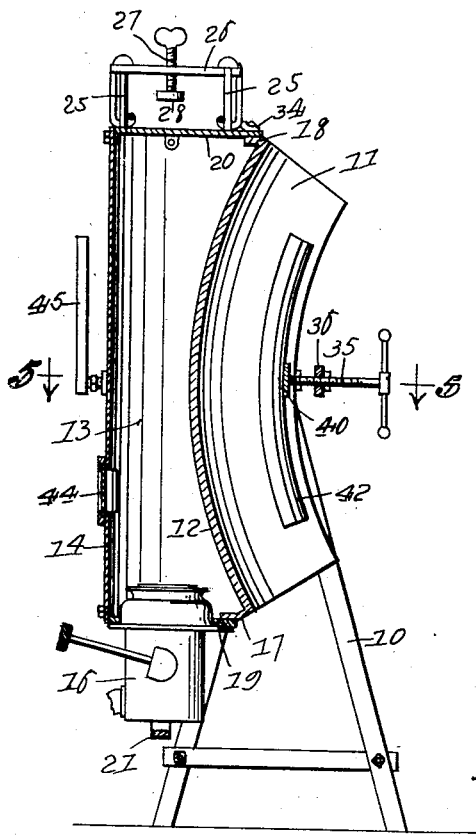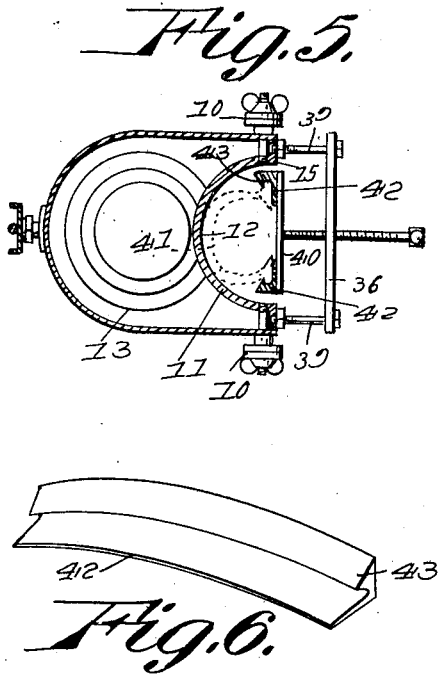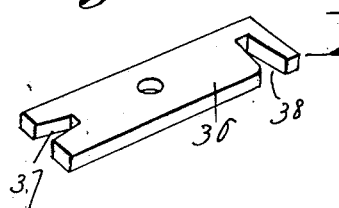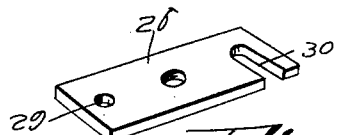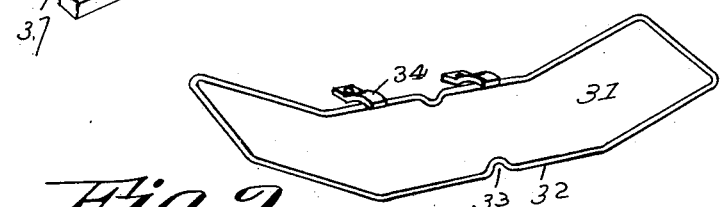

UNITED STATES PATENT OFFICE.

ARLO O. HARRIS, OF ST. LOUIS, MISSOURI.

VULCANIZER.

1,370,438.     Specification of Letters Patent.     Patented Mar. 1, 1921.

Application filed December 9, 1919. Serial No. 343,493.

*To all whom it may concern:*

Be it known that I, ARLO O. HARRIS, a citizen of the United States of America, residing at St. Louis, and State of Missouri, have invented new and useful Improvements in Vulcanizers, of which the following is a specification.

The object of the invention is to provide a simple, compact and efficient vulcanizing apparatus adapted for use in repairing tubes for automobile and similar tires and having means whereby patches located in different relations to the surface of the tire tube or casing may be brought into proper position to secure the effect of the vulcanizing operation, and to this end the invention consists in a construction and combination of parts of which the preferred embodiment is illustrated in the accompanying drawing, wherein:

Fig. 4 is a vertical sectional view of the apparatus.

Fig. 5 is a transverse sectional view on the plane indicated by the line 5—5 of Fig. 4.

Fig. 6 is a detail view of one of the tire casing shoes.

Figs. 7 and 8 are detail views of the movable carriers for the clamp screws used respectively to hold the casing and tube in place with reference to the seats provided for their reception.

Fig. 9 is a detail view of a rack or frame employed to support that portion of a tube which is not undergoing the vulcanizing operation.

Figure 1:
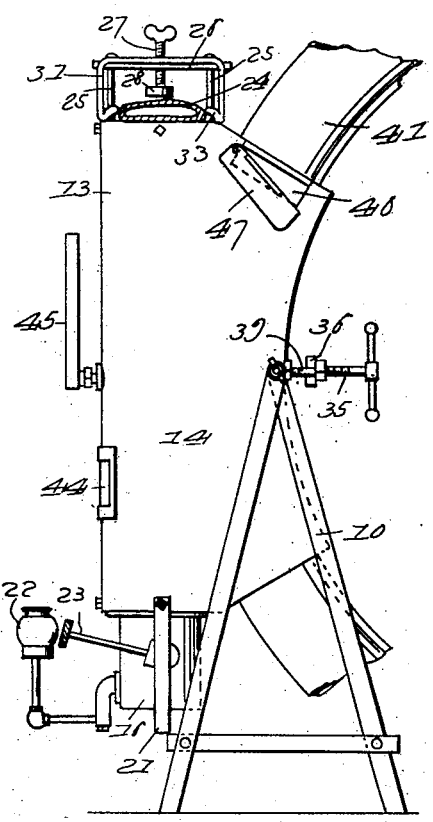
Figure 1 is a side view of the apparatus showing a tire casing and a tire tube arranged in operative positions therein.

Supported by suitable side standards 10 which may as indicated be of a foldable construction to permit of the packing of the apparatus within a comparatively small space for storage or transportation, is a tire casing seat 11 consisting of a casting of segmental form having an open outer side through which the casing may be introduced to bring its tread surface into contact with a wall 12 which is exposed to the temperature within a heat chamber 13 and forms one side wall thereof, the balance of the wall of the chamber being formed by a sheet metal plate 14 secured at its edges to a flange 15 extending laterally from the side and end edges of the seat 11 to the end that said seat projects into the heat chamber and is exposed throughout its length and depth to the temperature produced in the chamber by means of a suitable heating apparatus such as the lamp 16.

Figure 2:
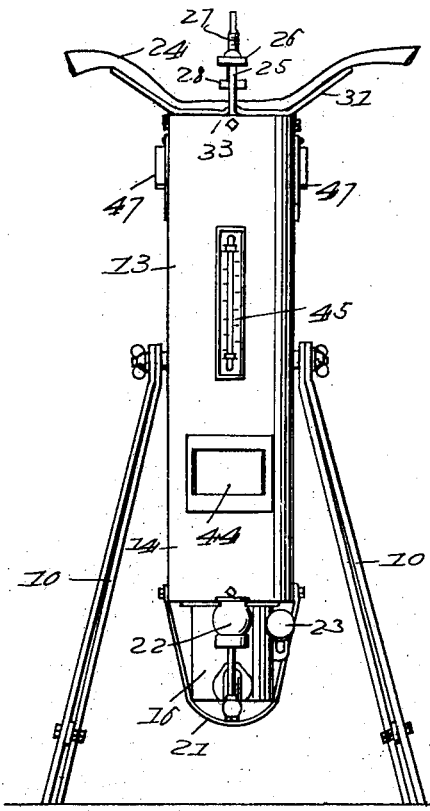
Fig. 2 is a front view of the same.
Figure 3:
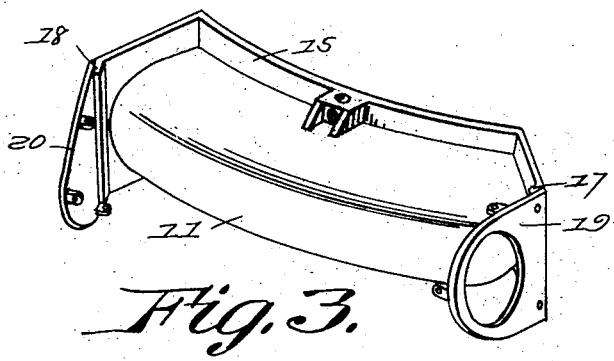
Fig. 3 is a detail view in perspective of the tire casing seat.

Extending from terminal ears 17 and 18 at the lower and upper edges of the casting forming the casing seat are the ring 19 and cover plate 20 corresponding in contour with the cross sectional area of the heat chamber and having the sheet metal wall 14 secured thereto, said ring and cover plate serving as forms for said wall. The lamp 16 is received within the opening of the ring 19, being supported by a suitable stirrup 21 and having a fuel reservoir 22 and wick regulator, 23 while the upper surface of the cover plate 20 constitutes a seat for a tire tube 24 as shown in Figs. 1 and 2. Rising from the cover plate are headed pins or standards 25 for supporting a clamp plate 26 in which is mounted a clamping screw 27 having at its lower end a follower 28 adapted to be adjusted to hold the tire tube in proper contact with the seat formed as above indicated, by the upper surface of the cover plate 28, to the end that a proper application of the heat within the chamber 13 may be made to the patched portion of the tube. In order that the clamp plate may be moved to permit of the placement of the tube upon the seat, it is preferably provided at one end with an opening 29 revolubly engaging one of the headed pins or standards 25 and at the other end with a notch or seat 30 for engagement with the other headed pin or stud. When the clamp screw has been loosened, the clamp plate may be swung laterally to expose the tire tube seat, and after the tube has been positioned said plate may be returned to the position indicated in Figs. 1 and 4 whereupon the tightening of the clamp screw to engage the tube as shown in Fig. 1 will serve to hold the plate in position and at the same time compress the tube into contact with the surface of the seat.

In order to support the body portion of the tube while an intermediate part thereof is being vulcanized, a frame or rack 31 shown in detail in Fig. 9 may be employed, the same preferably being of heavy wire or rod with its side members 32 provided with offsets 33 for engagement with the headed pins or studs 25, suitable clips 34 being engaged with one of the sides to prevent accidental displacement. The looped under portions of this rack or frame are preferably deflected upwardly as shown, to support the tube substantially as indicated in Fig. 2.

As will be understood from the foregoing description, the portion of the tread of a casing to be vulcanized may be arranged in the seat 11 where it is adapted to be held by a clamp screw 35 mounted in the clamp plate 36 indicated in detail in Fig. 7 and provided terminally with longitudinal and transverse notches 37 and 38 for engagement with headed pins or standards 39 projecting forwardly from the walls of said seat 11, a follower 40 being carried by the inner end of said clamp screw to secure the casing, shown at 41 in Fig. 1 with its surface in proper contact with the wall of the seat. Also in order to insure the proper positioning and holding of the casing in place during the vulcanizing process, shoes 42, of which one is shown in detail in Fig. 6 and which are provided with bead engaging flanges 43, may be fitted upon the casing opposite the portion to be vulcanized to receive the pressure of the follower plate 40 as will be understood by reference to Fig. 5 wherein the casing is shown in dotted lines.

In order that the condition of the flame of the burner may be determined at any time during the process, a transparent panel 44 is provided in the wall of the heat chamber, and in this connection also a thermometer or other heat indicator is employed as shown at 45, while in order to temper the heat or regulate it to avoid the possibility of burning the material which is under treatment, ventilating openings 46 may be employed near the upper end of the heat chamber fitted with pivotal closures 47.

What is claimed is:

1. A vulcanizing apparatus having a laterally accessible casing seat, a heat chamber bounded at one side by said seat and provided at its upper end with a cover plate forming a tire tube seat, means for securing a tire casing in the first-named seat, and means for clamping a tire tube in contact with said tube seat.

2. A vulcanizing apparatus having a heat chamber of which the upper terminal and side walls respectively form tire tube and casing seats, clamp plates movably mounted relative to and respectively spanning said seats, and clamping screws mounted in said clamp plates and respectively carrying followers for securing articles to be vulcanized in contact with the respective seats.

3. A vulcanizing apparatus having a heat chamber of which the side wall consists of a segmental outwardly open casing seat and a sheet metal plate secured at its edges to said seat, the latter being provided at its upper and lower ends respectively with a cover plate and a ring constituting means for maintaining said sheet metal plate in proper shape, and said cover plate and ring also respectively forming a tire tube seat and a lamp receiving seat, means for interiorly ventilating the heat chamber, and clamping means for respectively securing a tire casing and a tube in contact with the seats provided therefor.

4. A vulcanizing apparatus having a heat chamber provided in its side wall with an outwardly accessible tire casing seat, a heating apparatus disposed in the lower end of said chamber, a cover plate closing the upper end of said chamber and forming a tire tube seat, means for respectively securing a tire casing and tube in operative relation with said seats, and an open frame or rack carried by the tire tube seat and having looped portions extending beyond the area thereof for supporting the body portion of a tube arranged upon the seat.

In testimony whereof I affix my signature.

ARLO O. HARRIS.